(12) United States Patent
Cheng et al.

(10) Patent No.: US 9,798,797 B2
(45) Date of Patent: Oct. 24, 2017

(54) CLUSTER METHOD AND APPARATUS BASED ON USER INTEREST

(71) Applicant: Tencent Technology (Shenzhen) Company Limited, Shenzhen (CN)

(72) Inventors: Xiaomei Cheng, Shenzhen (CN); Xiaokang Su, Shenzhen (CN); Pengyun Zeng, Shenzhen (CN); Shiqing Fan, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 422 days.

(21) Appl. No.: 14/445,097

(22) Filed: Jul. 29, 2014

(65) Prior Publication Data

US 2014/0337347 A1 Nov. 13, 2014

Related U.S. Application Data

(63) Continuation of application No. PCT/CN2014/075088, filed on Apr. 10, 2014.

(30) Foreign Application Priority Data

Apr. 19, 2013 (CN) .......................... 2013 1 0137316

(51) Int. Cl.
*G06F 17/30* (2006.01)

(52) U.S. Cl.
CPC .. *G06F 17/30598* (2013.01); *G06F 17/30705* (2013.01)

(58) Field of Classification Search
USPC ....... 707/607, 609, 687, 705, 790, 813, 821, 707/953
See application file for complete search history.

(56) References Cited

U.S. PATENT DOCUMENTS

| 2003/0097186 | A1 | 5/2003 | Gutta et al. |
| 2000/0125377 | | 5/2009 | Somji et al. |
| 2013/0345969 | A1* | 12/2013 | Udeshi ................. G01C 21/30 701/461 |

FOREIGN PATENT DOCUMENTS

| CN | 101082972 A | 12/2007 |
| CN | 102063458 | 5/2011 |

(Continued)

OTHER PUBLICATIONS

International Search Report issued on Jul. 11, 2014 for PCT/CN2014/075088 filed on Apr. 10, 2014 in English.

(Continued)

*Primary Examiner* — Sana Al Hashemi
(74) *Attorney, Agent, or Firm* — Oblon, McClelland, Maier & Neustadt, L.L.P.

(57) ABSTRACT

A cluster method and apparatus based on user interest are provided in the present invention. The method includes: receiving pre-determined basic attribute data of a user; calculating a distance between the basic attribute data and a cluster center point, based on the cluster point of the basic attribute data related to the calculation of user interest; comparing the distance with a predefined threshold; if the distance is less than the predefined threshold, determining that the user belongs to a cluster of the interest. As the embodiments of the invention take the basic attribute data from the data of registered users into consideration, the recommendation of corresponding content is executed before getting user behavior data of browsing operations, based on the cluster of interest obtained from register information. Thus the accuracy of recommending to new registered users may be improved.

10 Claims, 3 Drawing Sheets

(56) References Cited

FOREIGN PATENT DOCUMENTS

| CN | 102591872 | 7/2012 |
| CN | 102609523 | 7/2012 |
| CN | 102915311 A | 2/2013 |
| WO | 03/043338 A2 | 5/2003 |

OTHER PUBLICATIONS

International Written Opinion mailed on Jul. 11, 2014 for PCT/CN2014/075088 filed on Apr. 10, 2014.
Office Action dated Aug. 29, 2017 in Chinese Patent Application No. 201310137316.0.
Shuai Jiang, "Research and Analysis of K-Means Clustering Algorithm," Chinese Master's Thesis Full-Text Database, Apr. 15, 2011, pp. 1140-1176.

\* cited by examiner

CLUSTER METHOD AND APPARATUS BASED ON USER INTEREST

CROSS-REFERENCE TO RELATED APPLICATIONS

This application is a U.S. continuation application under 35 U.S.C. §111(a) claiming priority under 35 U.S.C. §§120 and 365(c) to International Application PCT/CN2014/075088 filed on Apr. 10, 2014, which claims the priority benefit of Chinese Patent Application No. 201310137316.0 filed on Apr. 19, 2013, the contents of which are incorporated by reference herein in their entirety for all intended purposes.

FIELD OF THE INVENTION

The invention relates to the field of Internet, and more particularly, to a cluster method and apparatus based on user interest.

BACKGROUND

Currently, the cluster method based on user interest has been widely used in recommendations of web pages or advertisements, such that users can find interested web page contents or view interested commodities quickly.

Before accomplishing the cluster of user interest, it is necessary to find and make statistics of user interest. The current method of finding user interest is generally achieved by making statistics of the various operation data of web pages, such as opening times of a web page, content information of the searched products and category information of purchased products, then converting statistical data into weight values of corresponding user interest.

However, this method has a problem in terms of the cluster of user interest. Because only web page behavior data of a user is considered, if a user has not generated any behavior data before, interest of the user cannot be determined, the cluster operation cannot be performed any further, and thus the content recommended to the user would be inaccurate.

SUMMARY OF THE INVENTION

A cluster method based on user interest is provided by the embodiments of the present invention to solve the problems in the prior art, to improve the accuracy of the content recommended to the user. The problems include: if a user has not generated any behavior data, user interest cannot be determined, the cluster operation cannot be performed any further.

The embodiments of the inventions provide a cluster method based on user interest, the method comprising:

a receiving step for receiving pre-determined basic attribute data of a user;

a calculating step for calculating a distance between the basic attribute data and a cluster center point, based on the cluster center point of the basic attribute data related to the calculation of user interest;

a comparing step for comparing the distance calculated in the calculating step with a predefined threshold; and a determining step for determining that the user belongs to a cluster of the interest, if the distance is less than the predefined threshold.

The embodiments of the invention further provide a cluster apparatus based on user interest, the apparatus comprising:

a receiving unit, configured to receive pre-determined basic attribute data of a user;

a calculation unit, configured to calculate a distance between the basic attribute data and a cluster center point, based on the predefined cluster point of the basic attribute data related to the calculation of user interest;

a comparing unit, configured to compare the distance calculated by the calculation unit with a predefined threshold; and a determination unit, configured to determine that the user belongs to a cluster of the interest, if the distance is less than the predefined threshold.

In the embodiments of the invention, a distance between a basic attribute data of a user and a cluster center point is calculated, based on the received pre-determined basic attribute data of the user and the cluster center point of basic attribute data related to the calculation of user interest; the distance is compared with a predefined threshold; and it is determined that the user belongs to a cluster of the interest, if the distance is less than the predefined threshold. As the embodiments of the invention acquire the basic attribute data directly from the data of registered users, the recommendation of corresponding content can be executed based on the cluster of interest obtained from register information, before getting user behavior data of browsing operations. Thus, recommendation can be made to new registered users, the accuracy of the recommendation may be improved.

DETAILED DESCRIPTION

To better illustrate the purpose, technical solution and advantages of the present invention, in a further step, this invention will be detailed described in the following by the embodiments in conjunction with the accompanying drawings. It should be appreciated that, the detailed embodiments described herein are only intend for explaining the invention instead of limiting the invention.

The interest described in the embodiments of the invention refers to a user's preference to certain types of products or behaviors, for example, user's preference to electronics products, farm products, or reading fantasy novels, reading military news, etc. The cluster refers to looking for users with the same interest based on the interest of the user (i.e., the user's preference to products or behaviors), and classifying the users who have the same interest as one category. For instance, users who like to read fantasy novels may be classified as one category.

In the embodiments of the invention, a distance between basic attribute data of a user and a cluster center point is calculated, based on the received pre-determined basic attribute data of the user and the cluster center point of basic attribute data related to the calculation of user interest; the distance is compared with a predefined threshold; and it is determined that the user belongs to a cluster of the interest, if the distance is less than the predefined threshold. The recommendation of corresponding content can be executed based on the cluster of interest obtained from register information, before getting user behavior data of browsing operations. Thus, recommendation can be made to new registered users.

To further improve the accuracy of the recommendation, the embodiments of the invention also introduce user activity data and user behavior data into the calculation of the distance to the cluster center point. The calculated distance and the predefined threshold can be acquired by comprehensive comparison, and the accuracy of the cluster is further improved by more comprehensive data analysis. Correspondingly, the predefined threshold may be adjusted to change the number of cluster users, in order to better adapt to the number of clustering users who have a certain interest.

First Embodiment

Figure 1:
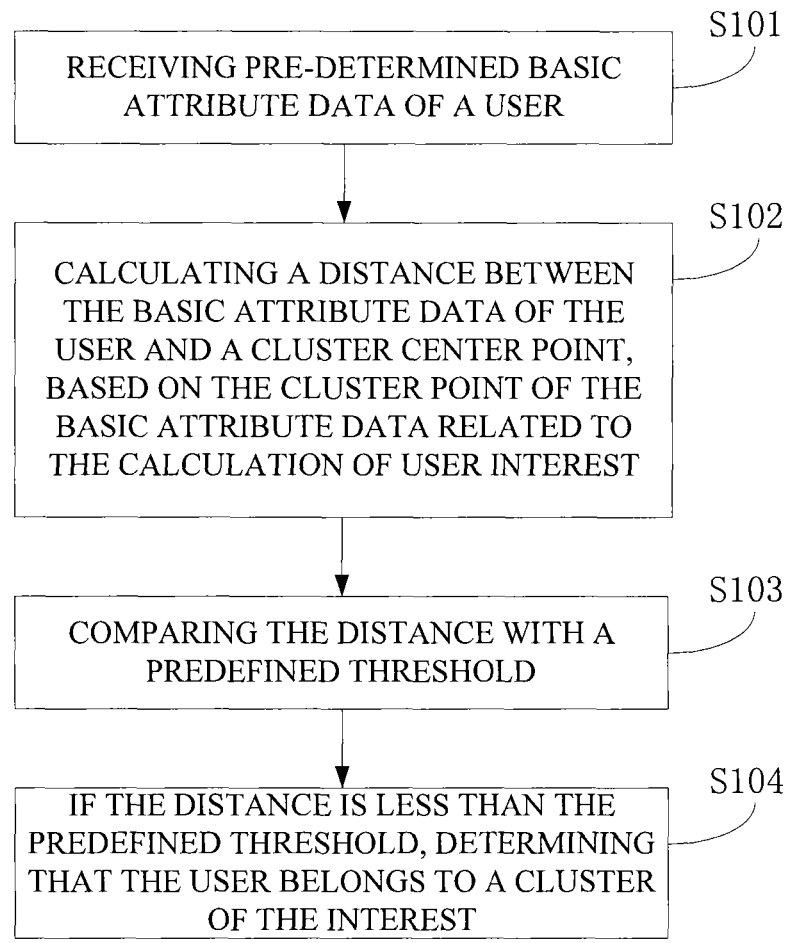
FIG. 1 is a flow diagram of implementing a cluster method based on user interest provided by a first embodiment of the invention.

FIG. 1 is a flow diagram of implementing a cluster method based on user interest, the detailed description is as follows:

At step S101, pre-determined basic attribute data of a user is received.

In particular, the basic attribute data of the user may be some regular personal data filled in by the user when registering, which may include gender, age, occupation, address, date of birth, horoscope, etc.

At step S102, a distance between the basic attribute data of the user and a cluster center point is calculated, based on a cluster point of basic attribute data related to the calculation of user interest;

In particular, the basic attribute data related to the calculation of user interest may be one or more items of the basic attribute data. If there is just one basic attribute data related to the calculation of user interest, the corresponding cluster center point is one value; if there are n basic attribute data related to the calculation of user interest, the corresponding cluster center point is an n-dimensional vector consisting of n values.

The distance may be Euclidean distance, Manhattan distance, or distance from the basic attribute data of the user to the cluster center point calculated by using Cosine similarity.

For calculating the cluster center point, the statistical data of the basic attribute related to interest should be required in advance. The cluster center point can be calculated, according to the relevance of different values of the same basic attribute to the interest and weight values of different basic attributes to the interest.

The process for obtaining the cluster center point may include the following steps:

1.1 quantizing the basic attributes related to the calculation of user interest.

In particular, the basic attribute related to the calculation of user interest may include many types, for example, the gender includes male, female and unknown, the age may include many values, etc.

1.2 acquiring a percentage of each quantized basic attribute with respect to the basic attribute for corresponding users.

After quantizing a plurality of types in a certain basic attribute, the percentage of users corresponding to each type with respect to the total users of the basic attribute is calculated, the result is usually pre-stored.

1.3 after multiplying the quantized basic attribute with the percentage of the corresponding users, and adding them together, the result of the cluster center point of this basic attribute data is calculated.

The process will be described in the following by the example of clustering the users who have online shopping interest.

The basic attributes related to online shopping interest include gender and age, other basic attributes such as address, user name and e-mail have no apparent relevance to online shopping interest.

According to statistical data, among the gender data about people interested in online shopping, male users occupy 30%, while female users occupy 70%. Firstly, this basic attribute of gender is quantized, wherein 1 represents male, 2 represents female, and 0 represents unknown. It is to be noted that the quantized data is only for explanation purpose and is not limited to these numbers, and choosing specific quantized values is associated with the weight value of the basic attribute related to the user interest. Therefore, the cluster center point of the gender attribute is: 2*0.7+1*0.3=1.7.

According to the statistical data of age for online shopping interest, 20 years old users occupy 70% of users interested in online shopping, and 25 year old users occupy the other 30% (it is supposed that there are two kinds of ages herein, actually a variety of age data is included). In the quantizing process, based on weights of ages to user interest, number 20 represents users whose age are 20 and number 25 represents users whose age are 25, thus the cluster center point for online shopping interest for the above-mentioned quantized age is 20*70%+25*30%=21.5.

Therefore, the above-mentioned data can be shown in the table below:

| Basic Attribute | Gender | Age | Address | Name |
| --- | --- | --- | --- | --- |
| Cluster center point | 1.7 | 21.5 | — | — |

After the cluster center point of basic attributes related to online shopping interest is obtained, the distance between the cluster center point and the basic attributes of a certain user can be calculated based on a cluster distance calculation equation. The cluster distance calculation equation may include Euclidean distance calculation equation, Manhattan distance calculation equation, Cosine similarity calculation equation, etc. As shown in the table, the cluster center point vector (gender, age) of the two basic attributes related to online shopping interest is (1.7, 21.5). And if a user is a 20 years old female, the Euclidean distance between the cluster center point and the two basic attributes of the current user can be calculated as:

$$\sqrt{(21.5-20)^2+(2-1.7)^2}=\sqrt{2.34}$$

At step S103, the calculated distance is compared with a predefined threshold.

A threshold is predefined based on the size of the user groups to be clustered, and this threshold is compared with the distance from step S102 (the distance may be a distance between a single basic attribute and the cluster center point, or a distance between multiple basic attributes and the cluster center point, the threshold is set as needed).

At step S104, if the distance is less than the predefined threshold, it is determined that the user belongs to a cluster of the interest.

In particular, if the distance between the basic attribute related to the interest and the cluster center point is less than the predefined threshold, it is determined that the user belongs to the cluster of the interest, i.e., this user has that interest. In the above-mentioned example, the threshold of the two basic attributes and the cluster center point is 1.7, it is determined that this user has interest in online shopping, because $1.7 > \sqrt{2.34}$.

In this embodiment, the basic attribute data is acquired from the data of registered users, the recommendation of corresponding content can be executed based on the cluster of interest obtained from register information, before getting user behavior data of browsing operations. Thus, recommendation can be made to new registered users, the accuracy of recommendation may be improved.

Second Embodiment

Figure 2:
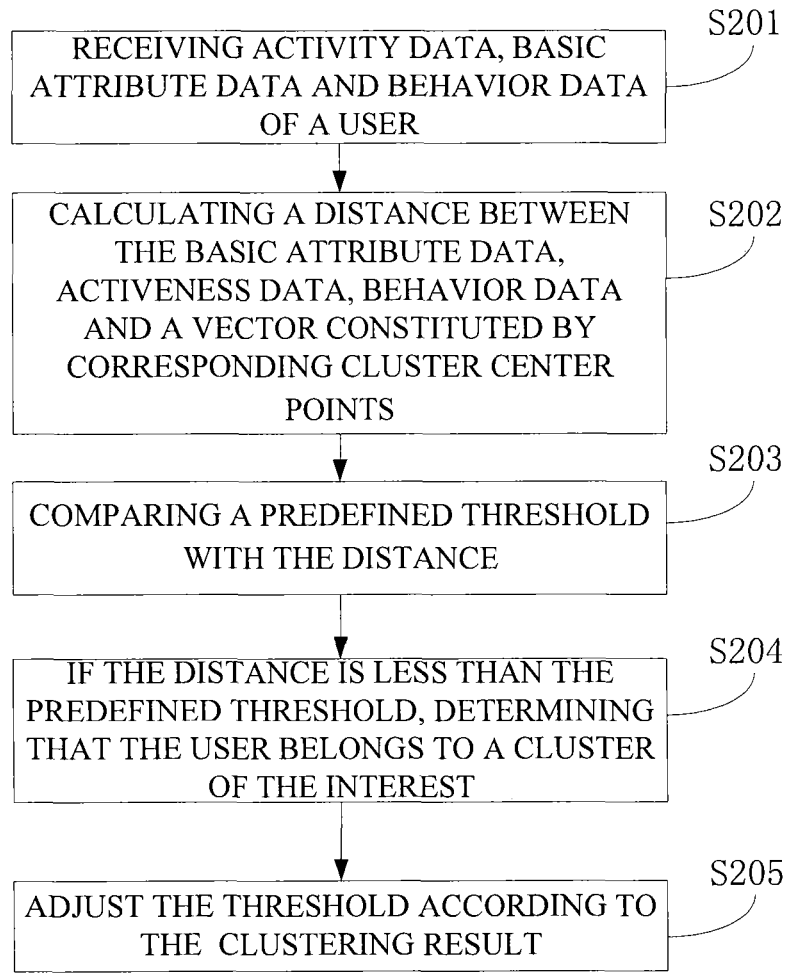
FIG. 2 is a flow diagram of implementing a cluster method based on user interest provided by a second embodiment of the invention.

FIG. 2 is a flow diagram of implementing a cluster method based on user interest provided by a second embodiment of the invention, the detailed explanation is as follows:

At step S201, activity data, basic attribute data and behavior data of a user are received.

In particular, there are many factors that are related to the user's interest. It is necessary to comprehensively take all or part of the factors into account when calculating the preference to an interest. As a comprehensive embodiment, this embodiment takes the activity factor, basic attribute data and behavior data of the user into consideration, and other factors related to the calculation of user interest may also be taken into consideration.

The activity data refers to average times of user's behavior (including actions of website browsing, searching and adding bookmarks) during a designated time period.

The basic attribute data of the user may include data like gender, age, occupation, address, date of birth, horoscope, etc.

For behaviors such as website browsing, searching and adding bookmarks, etc., they need to be converted into the access times for corresponding types of interest. As for website browsing behavior, a correspondence may be established between websites and types of interests, for example, www.taobao.com corresponding to online shopping interest; as for searching behavior, a correspondence may be established between search terms and types of interests, for example, search term "The lord of the Rings" corresponds to novel interest; and for adding bookmarks behavior, the action of adding websites is converted into corresponding interest, based on the correspondence between websites of browsing websites behavior and the type of interest. The behavior data includes the total behavior times of a user for a certain interest, the total behavior times of a user for all the interests, the total accessing days of a user for a certain interest, and the total accessing days of a user for all the interests, etc.

At step S202, a distance between the basic attribute data, activity data of users, behavior data and a vector constituted by corresponding cluster center points is calculated, based on the cluster center points of basic attribute data, activity data, behavior data related to the calculation of user interest.

In particular, based on the basic attribute of the user, the activity data and behavior data are added to improve the accuracy of the cluster for users.

As for activity data of the user, the average behavior time of the user can be divided into 3 levels (the definition and number of the level can be further divided under different situations). If the user's average behavior times range from 0 to a, the activity of the user may be 1; if the user's average behavior times range from a to 2a, the activity of the user may be 2; if the user's average behavior times range from 2a to 3a, the activity of the user may be 3. As it is preferred to have user of higher activity, in the calculation of the interest, the cluster center point of the activity is set to 3.

As for behavior data, its cluster center point is set to 1, because the percentage of total behavior times for a certain interest with respect to total behavior times of all the interest, and the percentage of total days for a certain interest with respect to total days of all the interest are preferred to be big. For example, supposing that a browser user has behavior data of 30 days, if the accessing days of novel interest are 15, and page view (PV) times of novel interest are 60; the accessing days of online shopping interest are 6, PV times of online shopping interest are 40, the PV percentage of novel interest is 60/100=0.6, the accessing day percentage is 15/30=0.5, while the PV percentage of online shopping is 40/100=0.4, the accessing day percentage is 6/30=0.2.

At step S203, a predefined threshold is compared with the distance between the calculated basic attribute data, activity data, behavior data and the vector constituted by corresponding cluster center points.

Supposing that the existing vector constituted by cluster center points of online shopping interest is (gender, age, activity, PV percentage of online shopping, accessing day percentage of online shopping)=(1.7, 20, 3, 1, 1), and a user is female, 20 years old, with activity 3, PV percentage of online shopping 0.8, accessing day percentage of online shopping 0.5, then the Euclidean distance between the user and the vector constituted by cluster center points can be represented as:

$$\sqrt{(2-1.7)^2 + (21.5-20)^2 + (3-3)^2 + (1-0.8)^2 + (1-0.5)^2} \approx 1.622$$

The factors calculated by this embodiment is 4, however, in other embodiments, the factors may be more or less than 4 factors, depending on the type of the interest.

At step S204, if the distance is less than the predefined threshold, it is determined that the user belongs to a cluster of the interest.

More specifically, the threshold distance is adjusted correspondingly due to the different numbers of data that are taken into consideration.

At step S205, the threshold is adjusted according to the size of clustered users.

Because of the difference of the group sizes of the recommendation objects targeted by different contents, sometimes, the number of clustered user may be too big or too small. Therefore, the step of adjusting the threshold according to the size of the clustered users should be included in this process to make the number of clustered users more reasonable. As such, this step may also be applied to the First Embodiment.

As another embodiment of the invention, activity data, basic attribute data are received;

a distance between the basic attribute data, activity data of users, and the vector constituted by corresponding cluster center points is calculated, based on a predefined cluster center point of basic attribute data related to the calculation of user interest, a cluster center point of activity data related to the calculation of user interest;

a predefined threshold is compared with the calculated distance.

The difference between the Second Embodiment and the First Embodiment is: the estimated preference of the user interest is more accurate by using multiple factors related to user interest, these factors include the distance between the vector of the cluster center points and basic attribute data of users, activity data of users, and behavior data of users. Furthermore, this process also includes the adjustment step of the threshold, which can adjust the number of clustered users and thus make the recommendation more flexible.

Third Embodiment

Figure 3:
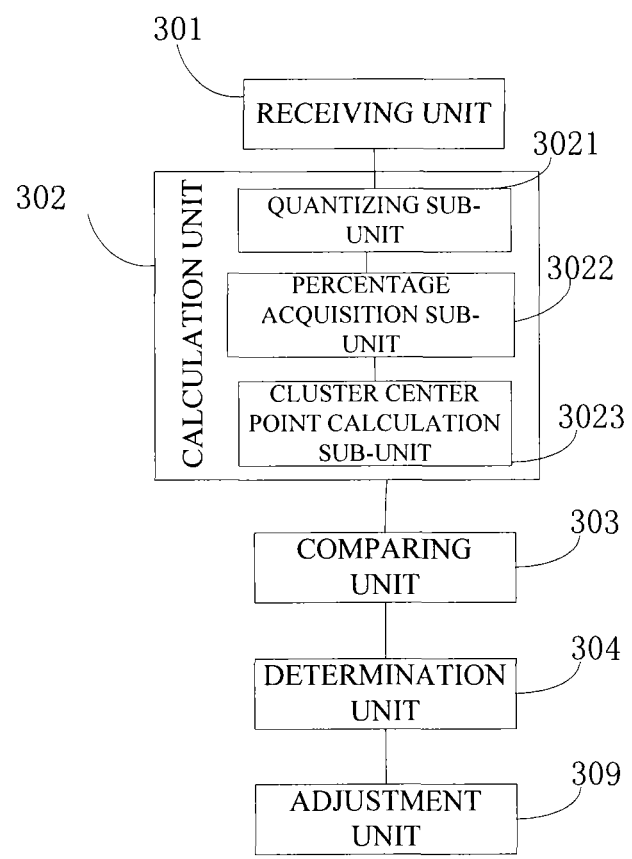
FIG. 3 is a structure diagram of a cluster apparatus based on user interest provided by a third embodiment of the invention.

FIG. 3 is a structure diagram of a cluster apparatus based on user interest provided by a third embodiment of the invention, the detailed explanation is as follows:

The cluster apparatus based on user interest as described in this embodiment, includes a receiving unit 301, a calculation unit 302, a comparing unit 303 and a determination unit 304, wherein:

the receiving unit 301 is configured to receive pre-determined basic attribute data of a user;

the calculation unit 302 is calculate a distance between the basic attribute data and a cluster center point, based on the predefined cluster point of the basic attribute data related to the calculation of user interest;

the comparing unit 303 is compare the distance calculated by the calculation unit 302 with a predefined threshold;

the determination unit 304 is configured to determine that the user belongs to a cluster of the interest, if the distance is less than the predefined threshold.

In order to make the clustering of users more accurate, the receiving unit 301 is configured to further receive activity data of the user;

the calculation unit 302 is configured to calculate a distance between the basic attribute data, the activity data and a vector constituted by corresponding cluster center points, based on the cluster center points of the basic attribute data and the activity data related to the calculation of user interest.

In order to further improve the accuracy of the clustering of users, the receiving unit 301 is configured to further receive behavior data of the user;

the calculation unit 302 is configured to calculate the distance between the basic attribute data, the activity data, the behavior data and a vector constituted by corresponding cluster center points, based on the cluster center points of the basic attribute data, the activity data, and the behavior data related to the calculation of user interest.

In the apparatus, the calculation unit 302 may include:

a quantizing sub-unit 3021, configured to quantize the basic attribute related to the calculation of user interest;

a percentage acquisition sub-unit 3022, configured to acquire a percentage of corresponding users of each quantized basic attribute with respect to the basic attribute;

a cluster center point calculation sub-unit 3023, configured to calculate the cluster center point of this basic attribute by multiplying the quantized basic attribute with the percentage of the corresponding users and then adding them together.

Wherein, the activity data includes any one or more of the followings: website browsing times, searching data times, and adding bookmarks times; the behavior data includes a percentage of total behavior times for a certain interest with respect to total behavior times for all the interests and/or a percentage of total accessing days for a certain interest with respect to total accessing days for all the interests.

Because of the difference of the group sizes of the recommendation objects targeted by different contents, sometimes, the number of clustered user may be too big or too small. Therefore, an adjustment unit 309 for adjusting the threshold according to the size of the clustered users is included in the apparatus to make the number of clustered users more reasonable.

The apparatus described in this embodiment corresponds to the cluster methods based on user interest described in the First Embodiment and Second Embodiment, the detailed description of the apparatus will not be repeated herein.

The embodiments referred above are just some preferred embodiments of the present invention, and not used to limit the invention. Any modifications, equivalent replacements or improvements that fall in the spirit and principle of the present invention are within in the protection scope of the invention.

What is claimed is:

1. A method for clustering a user based on a user interest, comprising:

receiving pre-determined basic attribute data of the user;

quantizing at least one type of basic attribute corresponding to a basic attribute for the user interest;

acquiring, for each quantized type, a percentage of a number of users that are associated with the respective quantized type corresponding to the basic attribute with respect to a total number of users that are associated with all types of the basic attribute;

calculating a cluster center point of the basic attribute by multiplying the respective quantized types with the corresponding percentages and adding results of the multiplication together;

calculating a distance between the pre-determined basic attribute data and the cluster center point, wherein the cluster center point is associated with basic attribute data for the user interest and corresponding to the pre-determined basic attribute data, and is calculated according to the at least one type of basic attribute;

comparing the calculated distance with a predefined threshold; and determining that the user belongs to a cluster of the user interest, if the distance is less than the predefined threshold.

2. An apparatus for clustering a user based on a user interest, comprising:

circuitry configured to receive pre-determined basic attribute data of the user;

quantize at least one type of basic attribute corresponding to a basic attribute for the user interest;

acquire, for each quantized type, a percentage of a number of users that are associated with the respective quantized type corresponding to the basic attribute with respect to a total number of users that are associated with ail types of the basic attribute;

calculate a cluster center point of the basic attribute by multiplying the respective quantized types with the corresponding percentages and adding results of the multiplication together;

calculate a distance between the pre-determined basic attribute data and the cluster center point, wherein the cluster center point is associated with basic attribute data for the user interest and corresponding to the pre-determined basic attribute data, and is calculated according to the at least one type of basic attribute;

compare the calculated distance with a predefined threshold; and determine that the user belongs to a cluster of the user interest, if the distance is less than the predefined threshold.

3. The method according to claim 1, wherein, in the receiving step, further receiving activity data of the user;

in the calculating step, calculating a distance between the basic attribute data, the activity data and a vector constituted by corresponding cluster center points, based on the cluster center points of the basic attribute data and the activity data related to the user interest.

4. The method according to claim 1, wherein, in the receiving step, further receiving behavior data of the user;

in the calculating step, calculating a distance between the basic attribute data, activity data, the behavior data and a vector constituted by corresponding cluster center points, based on the cluster center points of the basic attribute data, the activity data, and the behavior data related to the user interest.

5. The method according to claim 1, further comprising adjusting the threshold according to a size of clustered users.

6. The apparatus according to claim 2, wherein the circuitry is configured to receive activity data of the user;

calculate a distance between the basic attribute data, the activity data and a vector constituted by corresponding cluster center points, based on the cluster center points of the basic attribute data and the activity data related to the user interest.

7. The apparatus according to claim 2, wherein the circuitry is configured to receive behavior data of the user;

calculate a distance between the basic attribute data, activity data, the behavior data and a vector constituted by corresponding cluster center points, based on the cluster center points of the basic attribute data, the activity data, and the behavior data related to the user interest.

8. The apparatus according to claim 2, wherein the circuitry is configured to adjust the threshold according to a size of the clustered users.

9. The method according to claim 4, wherein, the activity data comprises any one or more of website browsing times, searching data times, and adding bookmarks times; and the behavior data comprises a percentage of total behavior times for a certain interest with respect to total behavior times for all the interests and/or a percentage of total accessing days for a certain interest with respect to total accessing days for all the interests.

10. The apparatus according to claim 7, wherein, the activity data comprises any one or more of website browsing times, searching data times, and adding bookmarks times; and the behavior data comprises a percentage of total behavior times for a certain interest with respect to total behavior times for all the interests and/or a percentage of total accessing days for a certain interest with respect to total accessing days for all the interests.

\* \* \* \* \*